United States Patent

Calo et al.

(10) Patent No.: US 9,450,878 B2
(45) Date of Patent: Sep. 20, 2016

(54) DYNAMIC MIDDLEBOX REDIRECTION BASED ON CLIENT CHARACTERISTICS

(75) Inventors: Seraphin B. Calo, Cortlandt Manor, NY (US); William Cornejo, Woodhaven, NY (US); Thai F. Le, White Plains, NY (US); Erich M. Nahum, New York, NY (US); Maroun Touma, Redding, CT (US); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 13/590,967

(22) Filed: Aug. 21, 2012

(65) Prior Publication Data

US 2014/0059190 A1    Feb. 27, 2014

(51) Int. Cl.
*G06F 15/16*   (2006.01)
*H04L 12/801*  (2013.01)
*H04L 12/803*  (2013.01)

(52) U.S. Cl.
CPC ............. *H04L 47/127* (2013.01); *H04L 47/12* (2013.01); *H04L 47/122* (2013.01)

(58) Field of Classification Search
CPC .................................................. H04W 92/02
USPC ......................................................... 709/221
See application file for complete search history.

(56) References Cited

U.S. PATENT DOCUMENTS

| | | | |
|---|---|---|---|
| 6,567,857 B1 * | 5/2003 | Gupta et al. | 709/238 |
| 6,701,374 B2 * | 3/2004 | Gupta et al. | 709/238 |
| 7,035,252 B2 * | 4/2006 | Cave et al. | 370/356 |
| 7,793,310 B2 * | 9/2010 | Celi et al. | 719/332 |
| 7,886,060 B2 | 2/2011 | Rosenberg | |
| 2001/0005372 A1 * | 6/2001 | Cave et al. | 370/401 |
| 2003/0200332 A1 * | 10/2003 | Gupta et al. | 709/238 |
| 2004/0052257 A1 | 3/2004 | Abdo et al. | |
| 2005/0232238 A1 * | 10/2005 | Oran | 370/352 |
| 2007/0109961 A1 * | 5/2007 | Liang | 370/229 |
| 2007/0180496 A1 * | 8/2007 | Fransdonk | 726/3 |
| 2007/0183375 A1 * | 8/2007 | Tiwari | 370/338 |
| 2008/0072305 A1 | 3/2008 | Casado et al. | |
| 2009/0154389 A1 * | 6/2009 | Srikrishna et al. | 370/312 |
| 2009/0175204 A1 * | 7/2009 | Kim | 370/256 |
| 2009/0245118 A1 * | 10/2009 | McCormick | 370/252 |
| 2009/0298525 A1 * | 12/2009 | Shaffer et al. | 455/519 |
| 2011/0096750 A1 * | 4/2011 | Velandy et al. | 370/331 |
| 2012/0084449 A1 * | 4/2012 | Delos Reyes et al. | 709/229 |
| 2012/0154506 A1 * | 6/2012 | Sylvain et al. | 348/14.01 |

(Continued)

OTHER PUBLICATIONS

Joseph, D., et al. "A Policy-Aware Switching Layer for Data Centers" Proceedings of the ACM SIGCOMM 2008 Conference on Applications, Technologies, Architectures, and Protocols for Computer Communications (SIGCOMM'08). Aug. 2008. pp. 51-62.

*Primary Examiner* — Hamza Algibhah
(74) *Attorney, Agent, or Firm* — Tutunjian & Bitetto, P.C.; Jennifer R. Davis (57) ABSTRACT

Traffic redirection methods include determining a quality-affective factor in a connection between a client and a server in a network; comparing the quality-affective factor to a threshold to determine whether the connection would benefit from a network processing function; reconfiguring the network to redirect the connection to or away from a middlebox that performs the network processing function in accordance with the determination of whether the connection would benefit from the network processing function.

23 Claims, 4 Drawing Sheets

(56) References Cited

U.S. PATENT DOCUMENTS

2012/0265810 A1* 10/2012 Reid et al. .................... 709/204
2013/0003735 A1* 1/2013 Chao et al. ................... 370/392
2013/0064246 A1* 3/2013 Dharmapurikar et al. ... 370/392
2013/0150054 A1* 6/2013 Axmon et al. ................ 455/440
2013/0282921 A1* 10/2013 Tran et al. ..................... 709/241
2014/0040457 A1* 2/2014 Agrawal et al. .............. 709/224

* cited by examiner

DYNAMIC MIDDLEBOX REDIRECTION BASED ON CLIENT CHARACTERISTICS

RELATED APPLICATION INFORMATION

This application is related to U.S. patent application Ser. No. 13/562,603, filed on Jul. 31, 2012, incorporated herein by reference in its entirety.

BACKGROUND

1. Technical Field

The present invention relates to network optimization and, more particularly, to the dynamic determination of client needs.

2. Description of the Related Art

With the growth in mobile data traffic, network congestion has become a major issue for mobile network operators. In response, vendors offer a large number of network appliances—commonly called middleboxes—to alleviate the situation. Middleboxes are designed to reduce transmission delay and improve the throughput of wireless users.

To simplify the configuration and management of client terminals, middleboxes are generally introduced in the network to operate in a transparent mode, where the middlebox transparently intercepts packets that are directed from a client to the server and, after processing the packets, forwards the same or modified packets towards the servers. Such an approach allows the middlebox to fully intercept and analyze requests from the users. The system includes of two logical connections, one from the client to the middlebox and one from the middlebox to the server, but both of these connections have the source and destination IP addresses set to the client and end server. The presence of the middlebox is rendered invisible to the end-users.

Existing middleboxes direct traffic in a static manner. For example, the middlebox intervenes based on specific source/destination IP addresses, IP subnets, or port numbers. Typically these static settings are changed only when the middlebox is restarted, which limits the middlebox's flexibility in the face of changing needs and network conditions.

SUMMARY

A traffic redirection method is shown that includes determining a quality-affective factor in a connection between a client and a server in a network; comparing the quality-affective factor to a threshold to determine whether the connection would benefit from a network processing function; reconfiguring the network to redirect the connection to or away from a middlebox that performs the network processing function in accordance with the determination of whether the connection would benefit from the network processing function.

A traffic redirection method is shown that includes determining network quality in a connection between a client and a server in a network, where the quality-affective factor is a measure of a quality of the connection; comparing the quality-affective factor to a threshold to determine whether the connection would benefit from a network processing function; and configuring the network based on the result of the comparison. Configuring the network includes if the connection would benefit and a middlebox is not already present in the connection, configuring a router to redirect the connection to a middlebox that performs the network processing function; and if the connection would not benefit and a middlebox is already present in the connection, configuring a router to exclude the middlebox from the connection.

A middlebox is shown that includes a network monitor module configured to determine a quality-affective factor in a connection between a client and a server in a network; a processor configured to compare the quality-affective factor to a threshold to determine whether the connection would benefit from a network processing function; and a network control module configured to reconfigure the network to redirect the connection to or away from a middlebox that performs the network processing function in accordance with the determination of whether the connection would benefit from the network processing function.

A middlebox is shown that includes a network monitor module configured to determine a quality-affective factor in a connection between a client and a server in a network, where the quality-affective factor is a measure of a quality of the connection; a processor configured to compare the quality-affective factor to a threshold to determine whether the connection would benefit from a network processing function; and a network control module configured to configuring the network based on the result of the comparison by, configuring a router to redirect the connection to a middlebox that performs the network processing function if the connection would benefit and a middlebox is not already present in the connection and configuring a router to exclude the middlebox from the connection if the connection would not benefit and a middlebox is already present in the connection.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Every middlebox in a network system represents a tradeoff. In return for some benefit, such as compression, web caching, and byte caching, a network stream incurs an overhead going through the middlebox that it otherwise would not incur. This overhead can affect network performance, which is sensitive to, among other things, the latency between the client and the server—a middlebox increases such latencies. For a middlebox to be useful and effective, the benefit it provides should outweigh the overhead it incurs. However, determining the cost/benefit crossover point is difficult.

Figure 1:
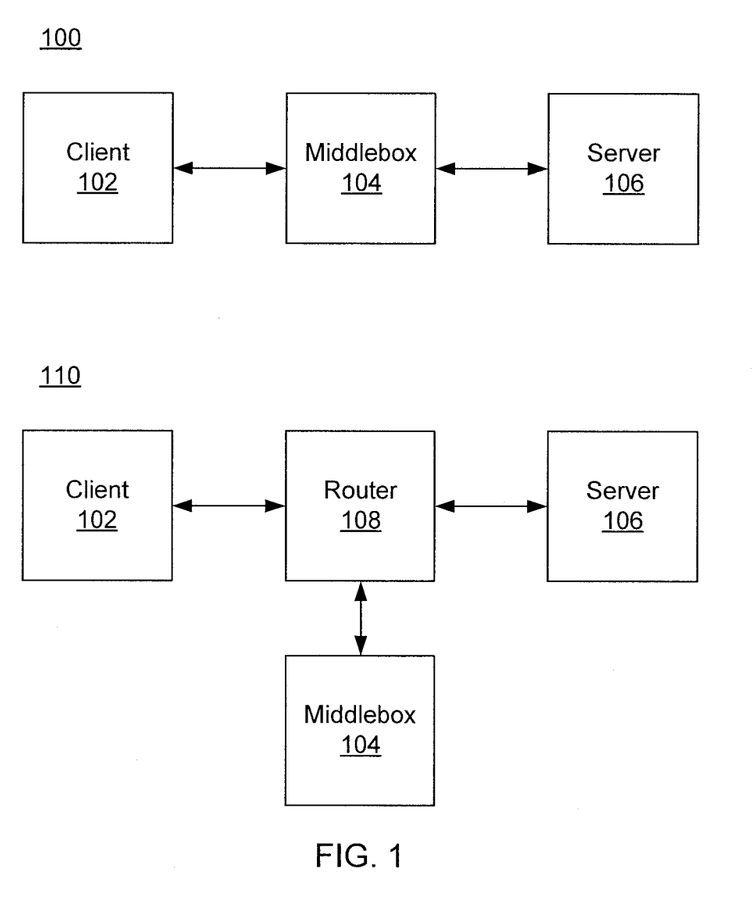
FIG. 1 is a diagram of networks with in-band and out-of-band middleboxes in accordance with the present principles.

Referring now to the drawings in which like numerals represent the same or similar elements and initially to FIG. 1, two exemplary embodiments of a network that includes a middlebox 104 are shown. A first network 100 includes an in-band middlebox 104 that performs, e.g., routing functions between the client 102 and the server 106. Such a middlebox may monitor communications between the client 102 and the server 106 and may enter and exit such connections as needed. A second network 110 shows an out-of-band middlebox 104 that communicates with a router 108. The middlebox 104 continues to monitor the communications between client 102 and server 106, but instructs the router 108 to perform traffic redirection on its behalf using, e.g., the web cache communication protocol (WCCP). Any number of clients 102, middleboxes 104, servers 106, and routers 108 may be present in a given network, and the number of devices and configuration of the network may change over time. The present principles are described with particular focus on the out-of-band embodiment 110, but it should be recognized that the in-band embodiment shown in network 100 is equivalent for the purposes of implementing the present principles.

When a middlebox 104 begins to participate in a connection, the middlebox establishes two distinct connections, one from the client 102 and one from the end-server 106. It is specifically contemplated that such connections may represent TCP connections, though any appropriate network protocol may be used in its place. The network medium between the client 102 and the middlebox 104 is specifically contemplated as being at least partially wireless, but may be wholly wired or a combination of wired and wireless networks. Similarly the connection between the middlebox 104 and the server 106 is specifically contemplated as being a wired network, but may be any appropriate form of network.

In general, all traffic between a client 102 and server 106 going through the middlebox 104 can be divided into two categories, that which benefits from the middlebox 104 and that which does not. The benefitted traffic is made up of communications for which the optimization benefits of the middlebox's intercession outweigh the overhead costs. Non-benefitting traffic is made up of communications for which no appreciable benefit is gained by going through the middlebox 104, or for which performance is actually degraded.

The static configuration of middleboxes 104 is wasteful for many reasons. For example, individual clients 102 may have different network characteristics, such as packet loss or latency, even within a given subnet. This is especially true for wireless clients. Furthermore, different clients 102 may have different application usage profiles. Some applications, such as video downloads, may benefit from the presence of a middlebox 104, whereas others may not. In addition, client network characteristics generally don't depend on IP address or subnet; instead they depend on the quality of the connection between the client and the network. For example, a wireless terminal's distance from its wireless access point can greatly affect the terminal's network characteristics and thereby affect the effectiveness of the middlebox 104.

To accomplish dynamic client evaluation, a function is used when the client 102 attaches to the network 110, or periodically over the lifetime of the client 102, to determine the network characteristics and application profile of the client 102. Some exemplary functions include a short network connection test (e.g., probes) between the client 102 and an access point to determine the quality of the connection (e.g., Round Trip Time, Packet Loss Rate, Throughput), global positioning system information regarding the position of the client 102 compared to a coverage map, and media access control (MAC) address information for the client 102, which could indicate a chipset known to be low-quality. Each of the aforementioned functions may be implemented through the use of a lookup table where, for example, a given round trip time or packet loss rate may be looked up to determine whether to use the middlebox 104. An exemplary function may approximate the throughput (e.g., as $$\frac{\sqrt{2/p}}{t}\Big)$$

from the measured loss rate p and measured round trip time t, and then determine whether the client throughput would benefit from the intervention of the middlebox. The result of using such a function allows a middlebox 104 or management module to determine dynamically whether the client 102 would benefit from the intervention of the middlebox 104.

When middleboxes 104 are present, the routers 108 in the network 110 are configured to tell which of the flows among different clients 102 would benefit from being redirected to the middleboxes 104. While this may be accomplished using static configurations, as pointed out above such static configurations are inefficient because only some traffic benefits when directed to middleboxes 104 and it is difficult to predict dynamic changes to those benefits. It is difficult to change the configuration for a middlebox 104 during operation, because such changes can disrupt existing connections. However, there are some instances when such a configuration is possible. The present principles identify such instances and perform reconfiguration at an opportune time.

Figure 2:
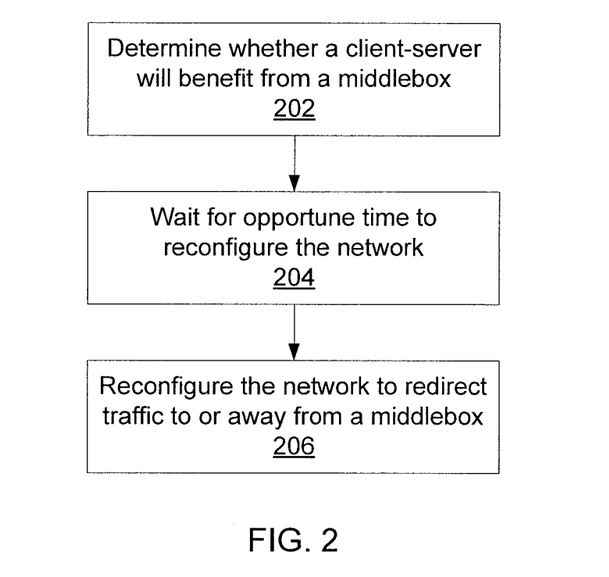
FIG. 2 is a block/flow diagram of a method for dynamically reconfiguring a middlebox in accordance with the present principles.

Referring now to FIG. 2, a block/flow diagram of dynamic reconfiguration of a middlebox 104 is shown. Block 202 makes a determination at selected points in time whether a given connection between a client 102 and a server 106 would benefit from the use of a middlebox 104. This determination can be performed at initiation of the connection and may further be performed at intervals during the connection. Such intervals may be periodic or they may be triggered by other conditions, such as the arrival or departure of another client 102 on the local network segment, changes in network congestion, or when a host is temporarily idle (such as when there are no active connections between the client 102 and the middlebox 104). When block 202 determines that the state of the connection between client 102 and server 106 should be changed, either to add or remove a middlebox 104, block 204 waits until an opportune time to reconfigure the network 110 to redirect traffic. Block 206 then reconfigures the network 110 by, e.g., directing router 108 to include or exclude the middlebox 104 in the connection between client 102 and server 106. These steps can be performed by a separate management module (e.g., a server 106 in the network 110), by a module in a middlebox 104, by a module in a router 108, or by any other appropriate device that has access to network traffic information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
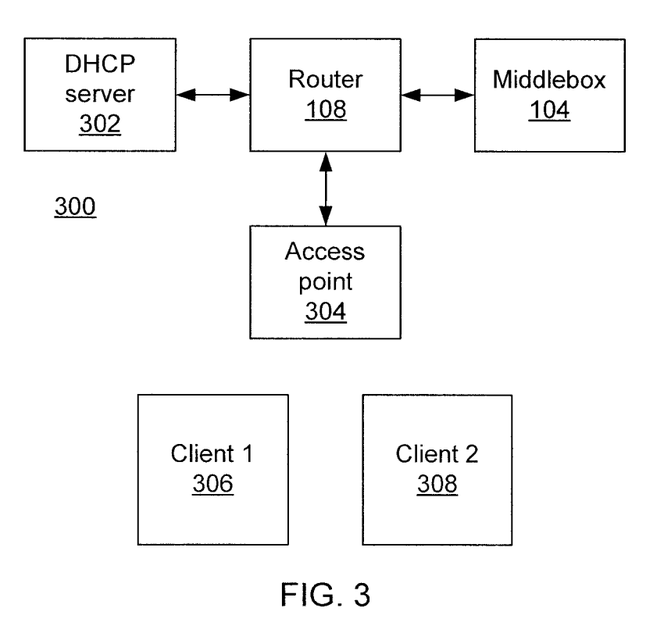
FIG. 3 is a diagram of an exemplary network including a wireless access point and a middlebox according to the present principles.

Referring now to FIG. 3, a specific network 300 is shown. The network 300 includes a router 108 connected to a middlebox 104 and a dynamic host configuration protocol (DHCP) server 302, as well as to an external network (not shown) which may include any number of routers 108 and servers 106. A wireless access point 304 is connected to the router 108 and provides wireless to first and second clients 306 and 308.

When a first client 306 arrives and associates with the access point 304, the first client 306 communicates with DHCP server 302 to obtain an IP address. The access point 304 invokes a function that returns a value indicating whether or not the first client 306 should use middlebox 104, as described in block 202 above. In this exemplary case, a wireless network quality test is run between the access point 304 and the first client 306. Assuming an illustrative first client 306 located a large distance from the access point 304, the bandwidth will be measured as being low with a high loss rate, and the function in the access point 304 providing the metric indicates that traffic should be redirected. The access point 304 stores the IP address of the first client 306 for later use in case the client 306 leaves.

The access point 304 communicates to the router 108 that all traffic to and from the first client 306 should be redirected to middlebox 104, as in block 206 above. The router 108 reconfigures its access control list to redirect the first client's traffic through middlebox 104, thereby establishing the redirected connection.

A second client 308 associates with access point 304 and obtains an IP address from the DHCP server 302. When the wireless access point 304 invokes a network quality test function, the second client 308 is determined to have a high bandwidth and low loss rate, such that the returned value indicates that the second client 308 should not be redirected.

The network conditions may then change with time. If the first client 306 departs, the wireless access point 304 notifies router 108 to remove the first client 306 from its access control list. If the second client 308 moves from its high-bandwidth position to the former location of the first client 306, which had poor bandwidth and loss rates, the access point 304 determines that the second client 308 would benefit from the use of middlebox 104 and signals to router 108 to add the second client's IP address to its access control list and to redirect the second client's traffic to middlebox 104. In this way, the network 300 flexibly adapts to changing conditions as wireless clients enter, leave, and change position.

Figure 4:
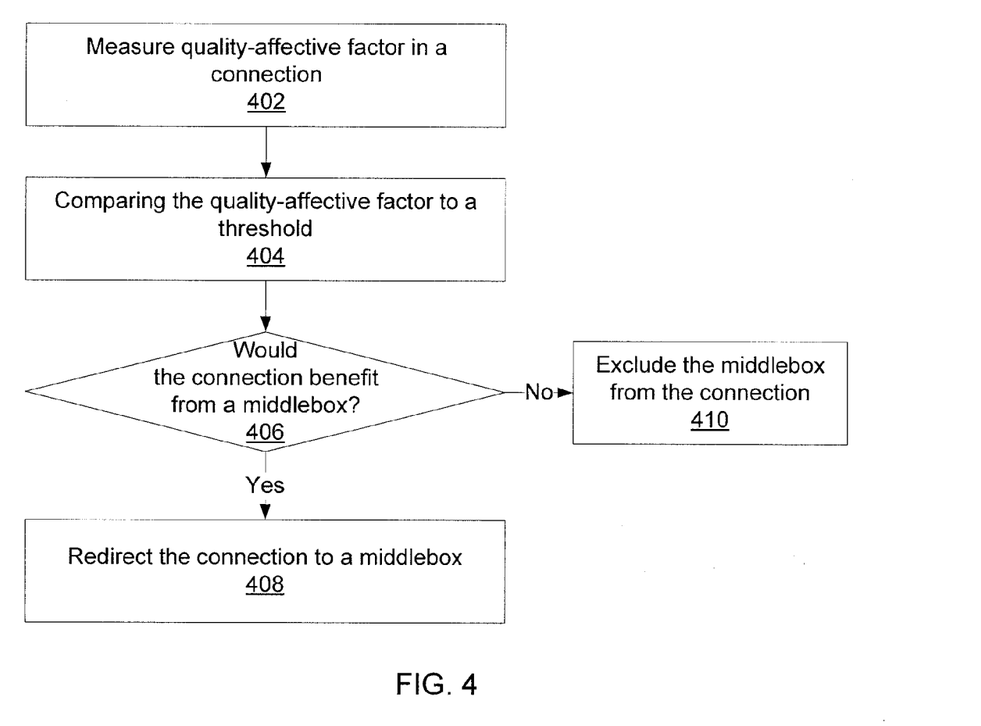
FIG. 4 is a block/flow diagram of a method for determining whether the use of a middlebox would be beneficial to a connection in accordance with one illustrative embodiment.

Referring now to FIG. 4, a block/flow diagram of a method for determining whether a connection would benefit from a middlebox 104 is shown. Block 402 measures a quality-affective factor. Several such factors are specifically contemplated herein, though it should be understood that those having ordinary skill in the art could extend the present principles to any appropriate factor that affects the quality of a network connection. For example, measures of network throughput, of client location and wireless coverage area, or of client chipset quality may be used, or some combination of those factors or other factors. The quality-affective factor is compared to a threshold in block 404. This threshold represents a quantity appropriate for the particular quality-affective factor found in block 402. For example, the threshold may represent a minimum throughput or coverage, or it may represent a minimum quality level for among a chipset represented by the client's MAC address. Block 406 determines, based on the comparison of block 404, whether the connection would benefit from the introduction of a middlebox 104. If so, block 408 signals, e.g., router 108 to redirect network traffic in the connection between the client 102 and the server 106 to the middlebox 104. If the middlebox 104 is already involved in the connection, then block 408 does nothing. If the connection would not benefit, or no longer benefits, from the presence of the middlebox 104, then block 410 instructs router 108 to remove the middlebox 104 from the connection, or to do nothing if the middlebox 104 is not already present in the connection.

Figure 5:
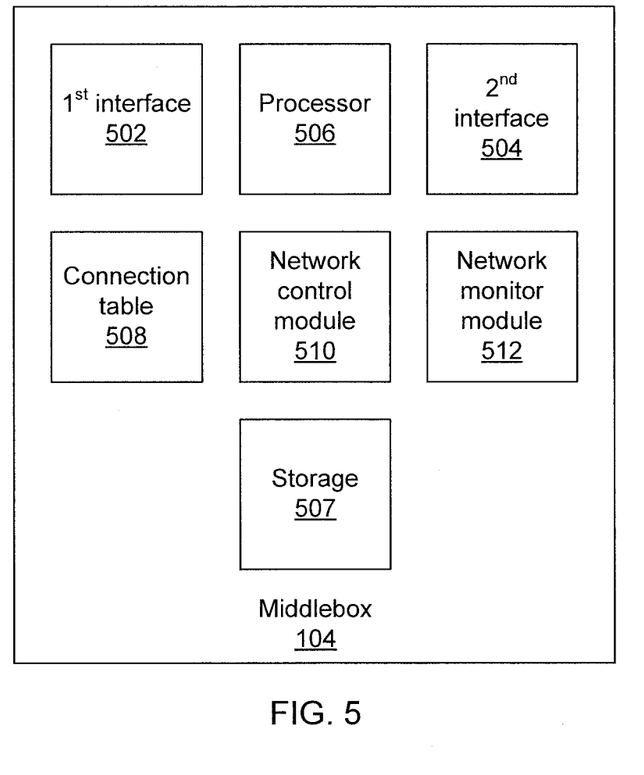
FIG. 5 is a diagram of a middlebox according to the present principles.

Referring now to FIG. 5, a diagram of a middlebox 104 is shown according to the present principles. The middlebox 104 includes two network interfaces 502 and 504 that communicate with the client 102 and the server 106. The two interfaces 502 and 504 may represent logical interfaces maintained on a single hardware interface, or they may be two separate hardware interfaces. In the case of two separate hardware interfaces, each interface may connect to the same network segment or to separate network segments.

The middlebox 104 further includes a connection table 508, which stores information regarding network connections maintained by the first and second interfaces 502 and 504. The connection table 508 may be stored in storage 507. A network control monitor module 512 uses the interfaces 502 and 504 to collect information regarding the state of connections on the interfaces 502 and 504, as well as information about other connections on the network. In particular, the network monitor module 512 collects information regarding the quality-affective factors used in determining whether the middlebox 104 should be used in a given connection. A processor 506 uses the monitored network information to determine whether a given connection would benefit from the intercession of the middlebox 104 and also determines when two connections to the middlebox 104 are out of sync. A network control module 510 manipulates connections to the client 102 and server 106 through the interfaces 502 and 504 to insert and remove the middlebox 104 from the connections as needed.

Having described preferred embodiments of a system and method for dynamic middlebox redirection based on client characteristics (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A traffic redirection method, comprising:
    determining a quality-affective factor comprising a throughput in an existing connection between a client and a server in a network;
    comparing the quality-affective factor to a threshold to determine whether the connection would benefit from a network processing function; and
    reconfiguring the network to redirect the connection to a middlebox that performs the network processing function in accordance with a determination that the connection would benefit from the network processing function and away from a middlebox already present in the connection, wherein redirecting the connection away from the middlebox comprises configuring a router to exclude the middlebox from the connection in accordance with a determination that the connection would not benefit from the network processing function, to cease operation of the middlebox on the connection.

2. The method of claim 1, wherein the throughput is calculated as $$\frac{\sqrt{2/p}}{t},$$

where p is a packet loss rate and t is a measured round trip time.

3. The method of claim 1, wherein the quality-affective factor includes a client location.

4. The method of claim 3, wherein said determining comprises comparing the client location to a coverage map to determine a signal quality.

5. The method of claim 1, wherein the quality-affective factor includes a media access control (MAC) address for the client.

6. The method of claim 5, wherein said determining includes comparing the MAC address to a table of known low-quality chipsets.

7. The method of claim 1, further comprising delaying reconfiguration of the network until a condition is met.

8. The method of claim 7, wherein reconfiguration is delayed until the configuration is idle.

9. The method of claim 1, wherein said determining is performed periodically.

10. The method of claim 1, wherein said determining is performed when a second client arrives or departs in the network.

11. The method of claim 1, wherein said determining is performed upon a change in network congestion.

12. A traffic redirection method, comprising:
 determining a quality-affective factor in an existing connection between a client and a server in a network, where the quality-affective factor is a measure of a quality of the connection;
 comparing the quality-affective factor to a threshold to determine whether the connection would benefit from a network processing function; and
 configuring the network based on the result of the comparison, where said configuring comprises:
  if the connection would benefit and a middlebox is not already present in the connection, configuring a router to redirect the connection to a middlebox that performs the network processing function; and
  if the connection would not benefit and a middlebox is already present in the connection, configuring a router to exclude the middlebox from the connection to cease operation of the middlebox on the connection.

13. The method of claim 12, wherein the quality-affective factor includes a throughput.

14. The method of claim 13, wherein the throughput is calculated as $$\frac{\sqrt{2/p}}{t},$$

where p is a packet loss rate and t is a measured round trip time.

15. The method of claim 12, wherein the quality-affective factor includes a client location.

16. The method of claim 15, wherein said determining comprises comparing the client location to a coverage map to determine a signal quality.

17. The method of claim 12, wherein the quality-affective factor includes a media access control (MAC) address for the client.

18. The method of claim 17, wherein said determining includes comparing the MAC address to a table of known low-quality chipsets.

19. The method of claim 12, wherein said determining is performed periodically.

20. The method of claim 12, wherein said determining is performed when a second client arrives or departs in the network.

21. The method of claim 12, wherein said determining is performed upon a change in network congestion.

22. The method of claim 12, further comprising delaying reconfiguration of the network until the connection is idle.

23. A traffic redirection method, comprising:
 periodically determining a quality-affective factor in an existing connection between a client and a server in a network, where the quality-affective factor is a measure of a quality of the connection;
 comparing the quality-affective factor to a threshold to determine whether the connection would benefit from a network processing function; and
 configuring the network based on the result of the comparison when the client is idle, where said configuring comprises:
  if the connection would benefit and a middlebox is not already present in the connection, configuring a router to redirect the connection to a middlebox that performs the network processing function; and
  if the connection would not benefit and a middlebox is already present in the connection, configuring a router to exclude the middlebox from the connection to cease operation of the middlebox on the connection.

* * * * *